Patented July 13, 1954

2,683,683

UNITED STATES PATENT OFFICE 2,683,683

PURIFICATION OF OILS

George Alexander Mills, Swarthmore, Pa., assignor to Houdry Process Corporation, Wilmington, Del., a corporation of Delaware No Drawing. Application April 6, 1951,
Serial No. 219,767

2 Claims. (Cl. 196—23)

This invention relates to catalytic conversion of hydrocarbons and is concerned chiefly with operations in which cracking catalysts are employed, such as the cracking of petroleum oils producing hydrocarbons of lower molecular weight. It is directed more specifically to the preparation of improved stocks for charging to such catalytic processes.

In the conventional operations for catalytic conversion of petroleum oils, the charge stock is contacted at elevated temperature with a catalyst at selected and controlled conditions of operation. As a result of the operation, the charge stock is converted by reactions, including hydrogen transfer, molecular scission, rearrangement and condensation, into hydrocarbons of lower molecular weight and differing in structure from that of the components in the original charge stock. In addition to liquid hydrocarbons there are also formed in the operation a greater or less quantity of hydrocarbon gases and a carbonaceous residue called "coke" (which is deposited in and on the catalyst). Inasmuch as the coke deposit causes a substantial diminution in the ability of a catalyst to effect the desired results, provision is made to remove periodically the coke deposit from the catalyst. The customary method of removal entails the combustion of the coke by treatment with an oxidizing gas such as air, and the catalyst after such regeneration is again available for further contact with additional hydrocarbons.

While the deposition of coke on the catalyst during the cracking operation results in a relatively rapid reduction in catalytic activity, the catalyst by such regeneration can be restored with reasonable ease to substantially its original activity level. Other factors operating with less rapidity but greater permanence have detrimental effect on both activity and selectivity, i. e., the ability to produce the desired quantity and quality of products, of the catalyst simultaneously with the deposition of coke on the catalyst. The oxidative treatment of the catalyst while it effectively removes substantially all of the coke deposit has little appreciable effect on the removal from the catalyst of other deleterious factors so that over extended time periods the inactivating and other detrimental effects of these other factors increase to an undesirably high level. This phenomenon is referred to as aging, and includes such factors as the loss of activity as a result of contact with steam or excessive temperatures and the loss of selectivity by the accumulation on the catalyst of heavy metals in a state which is detrimental to desired catalytic properties.

Attempts have been made recently to solve the problem of loss of selectivity by special treatment of the catalyst directed specifically to the removal of detrimental components form catalyst material, such as for example in Hornaday U. S. Patent No. 2,494,556.

The present invention is directed not to treatment after such components have been detrimentally deposited within the cracking system, but to removal of deleterious components by the treatment and preparation of hydrocarbon charge stocks which will have a reduced tendency, if any, to deposit deleterious materials in the catalyst when such stocks are subjected to catalytic conversion.

It has been shown, for example in my article appearing in the Industrial and Engineering Chemistry, vol. 42, page 182, January, 1950, that the more important factors causing the aging of catalyst include the contamination of the catalyst by certain metals, particularly heavy metals, deposited therein from hydrocarbon charge stocks. As shown therein, very small amounts of heavy metals such as iron, nickel, vanadium and copper are detrimental to the type of catalysis desired in cracking. Heavy metals and/or compounds of this type occur as such or in some modified form and in greater or less amount in practically all of the known stocks available for catalytic cracking. A primary object of the present invention, therefore, is to provide for the more effective removal of such deleterious substances from petroleum and hydrocarbon stocks to obtain thereby improved charging stocks for catalytic processing.

A further object of the invention is to effect removal from charge stocks of deleterious substances, such as volatilizable metal compounds, which are not removed by previous methods of charge stock treatment and preparation.

In accordance with this invention, heavy metals, e. g., iron, nickel, vanadium, copper, and/or their compounds and the like are substantially removed from petroleum stocks by conversion of such heavy metal components to insoluble sulfur-containing compounds by treatment with a sulfiding agent under conditions of excess sulfide ion concentration followed by removal of the insoluble compounds from the stock. Particularly effective methods in obtaining the insoluble sulfide materials include conducting the sulfiding operations under neutral to basic conditions and/or in the presence of a polar solution.

The amount of heavy metals in various petroleum stocks differs considerably depending on the nature of the crude oil and the location or area from which it is obtained. In addition to the heavy metal, these crude oils frequently contain sulfur usually present as organic sulfur compounds. This sulfur material present in the stock does not react to any substantial extent with the heavy metal components to form therewith insoluble compounds. It is therefore necessary to add a suitable sulfiding agent to effect sulfidation of the heavy metal components in accordance with this invention. The amount of sulfiding agent added should be at least the amount necessary to react with all of the heavy metal components and preferably is added in excess over the theoretically required amount in order that complete reaction of the heavy metal components can be obtained. The sulfiding agents employed are of a type which either react directly with the heavy metal components to form insoluble compounds or are sulfur-containing compounds which due to the effect of environment and the conditions thereof break down to active sulfiding agents in sufficient quantity to effect the desired sulfiding. These sulfiding agents include such compounds as hydrogen sulfide, ammonium sulfide and alkaline sulfides and polysulfides, or the like, which react in desired manner with the heavy metal components, and may be obtained from any suitable source.

The conditions of treatment are limited only in that substantially complete contact of the sulfiding agent with the heavy metal components of the crude oils should be obtained and that thereafter the treated crude oil material is in a form reasonably susceptible to the separation and removal of the heavy metal sulfides. The charge stock thus can be maintained either in liquid phase, mixed phase or vapor phase during treatment according to the nature of the heavy oil being treated and the separation treatment to which it is subjected.

It is desirable in operation of this invention not only to remove the insoluble heavy metal sulfides, but to remove also extraneous sulfiding agents which have not been consumed in the sulfiding process. While not essential to the operation of this invention, it is preferred to remove these extraneous sulfiding agents inasmuch as under some conditions and with some catalyst materials, a detrimental effect on the cracking operation may result. It is, therefore, desirable to combine the removal of the insoluble sulfides and excess sulfiding agents at about the same period in the stock preparation procedure inasmuch as this operation may prove more convenient and economical than two distinct separating treatments.

Many suitable ways of effecting the separation of the insoluble sulfur-containing compounds from the charge stock are available. A few of these methods being by filtration, electrostatic separation, flash evaporation of the lighter components of the charge stock leaving the metal-containing materials in a residue; and other fractionation procedures including deasphalting or the like. In one preferred embodiment of operation in accordance with this invention, crude oil containing detrimental amounts of heavy metals is treated with sulfiding agent prior to or during "desalting" which is a treatment for the removal of naturally occurring salts of metals such as those of sodium, calcium, and magnesium; and the resulting insoluble sulfides are removed from the crude oil simultaneously with the above-mentioned salts during the "desalting" operation, thus obtaining the advantage of a single separation step.

The following table is illustrative of the very effective reduction of heavy metals by treatment of heavy stock in accordance with this invention. In these examples, the sulfiding treatments were made by taking measured samples of the heavy stock, heating the samples to reduce the viscosity thereof, contacting the heated samples with the several sulfiding agents, and thereafter separating the formed insoluble heavy metal sulfides from the oil by filtration through a filter bed of celite. All conditions and processing steps were similar except as indicated, and all tests were on portions of the same stock, i. e., a reduced crude, which were ashed and analyzed after treatment.

| Treatment | None, Filtered, Analyzed | Isopropanol and $H_2S$, Filtered, Water Washed, Analyzed | Water and $H_2S$, Filtered, Analyzed | $NH_4OH$ and $H_2S$ Filtered, Water Washed, Analyzed |
|---|---|---|---|---|
| Chemical Analysis of Treated Stock, Wt. Percent of Oil: | | | | |
| Total Metals | 0.022 | 0.004 | 0.0043 | 0.004 |
| Fe | 0.006 | 0.001 | 0.0008 | 0.0002 |
| Ni | 0.0002 | (1) | (1) | (1) |
| Cu | 0.004 | (1) | (1) | (1) |

[1] Too small to analyze.

As is evident in the above table a substantial reduction in the amounts of heavy metals contained therein is obtained by the several different types of treatment all within the range of this invention. The residual amounts of heavy metals are well below the amounts which were found to have detrimental effect on the selectivity of catalyst, as more fully shown in my hereinabove identified article.

While the foregoing descriptions and examples have emphasized the advantages of this invention with regard to the benefication of heavy charge stocks for catalytic cracking processes, it is to be understood that the invention is not limited thereto. Thus, the invention has like advantages in the improvement of other types of petroleum and hydrocarbon stocks which subsequently are subject to conversion in the presence of catalysts unfavorably affected by the heavy metals removable through practice of this invention.

Obviously many modifications and variations of the invention as hereinbefore set forth may be made without departing from the spirit and scope thereof, and therefore only such limitations should be imposed as are indicated in the appended claims.

I claim:

1. In the process of catalytically cracking petroleum fractions derived from crude oils containing heavy metal components deleterious in the catalytic cracking of such oils, the improvement which comprises subjecting an oil containing such heavy metal components to contact with a sulfiding agent selected from the group consisting of hydrogen sulfide and ammoniacal hydrogen sulfide, reacting said agent with said components and forming insoluble heavy metal sulfides, and removing said heavy metal sulfides and excess sulfiding agent from the oil prior to contact of the oil with the cracking catalyst.

2. A process for preparing an improved hydrocarbon charge stock for catalytic conversion to products of different structure and molecular weight from charge stock containing heavy metals detrimental to catalyst selectivity, comprising treating such hydrocarbon charge stock with a sulfiding agent selected from the group consisting of hydrogen sulfide and ammoniacal hydrogen sulfide to sulfide said heavy metals to sulfides insoluble in said hydrocarbon stock, separating insoluble sulfides from said hydrocarbon stock, and recovering an improved charge stock substantially free of heavy metal components.

References Cited in the file of this patent

UNITED STATES PATENTS

| Number | Name | Date |
|---|---|---|
| 1,684,159 | Tijmstra | Sept. 11, 1928 |
| 1,980,555 | Schulze et al. | Nov. 13, 1934 |
| 2,187,741 | Houdry | Jan. 23, 1940 |
| 2,383,972 | Jones | Sept. 4, 1945 |